(12) United States Patent
Chung et al.

(10) Patent No.: US 7,753,536 B2
(45) Date of Patent: Jul. 13, 2010

(54) DYNAMIC APERTURE AND PROJECTION DEVICE HAVING SAME

(75) Inventors: Hsieh-Tung Chung, Taipei Hsien (TW); Wen-Pin Yeh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/331,414

(22) Filed: Dec. 9, 2008

(65) Prior Publication Data

US 2010/0097577 A1    Apr. 22, 2010

(30) Foreign Application Priority Data

Oct. 20, 2008    (CN)    ............ 2008 1 0305029

(51) Int. Cl.
*G03B 21/14*    (2006.01)
*G03B 21/22*    (2006.01)
*G02B 26/02*    (2006.01)

(52) U.S. Cl. .................. 353/97; 353/75; 359/232; 359/233; 359/739

(58) Field of Classification Search .......... 353/97, 353/75; 359/227, 232, 233, 738, 739; 369/118
See application file for complete search history.

(56) References Cited

U.S. PATENT DOCUMENTS

| 3,978,503 A * | 8/1976 | Shono ................. 396/493 |
| 4,609,268 A * | 9/1986 | Crawford ............. 353/25 |
| 4,876,563 A * | 10/1989 | Ishida et al. ......... 396/448 |
| 5,159,372 A * | 10/1992 | Nomura et al. ....... 396/448 |
| 2006/0050248 A1 * | 3/2006 | Koga et al. ........... 353/97 |

* cited by examiner

*Primary Examiner*—Georgia Y Epps
*Assistant Examiner*—Magda Cruz
(74) *Attorney, Agent, or Firm*—Zhigang Ma

(57) ABSTRACT

A dynamic aperture, positioned in the path of light, includes a pair of parallel blades, a connecting member, a driving member, and a motor. The projection device includes a light source configured for generating light. The connecting member is fixed to the projection device and rotatably interconnects a same side of the blades. The driving member rotatably interconnects the opposite side of the blades so that the blades, the connecting member, and the driving member constituting a variable quadrangular frame. The motor is coupled to the driving member and is configured for rotating the driving member. Rotation of the driving member and restriction of the projection device to the connection member alter dimensions of the variable quadrangular frame and accordingly adjust a gap between the blades through which the generated light passes.

14 Claims, 4 Drawing Sheets

DYNAMIC APERTURE AND PROJECTION DEVICE HAVING SAME

BACKGROUND

1. Technical Field

The disclosure relates to aperture and projection devices and, particularly, to a dynamic aperture and a projection device having the same.

2. Description of the Related Art

In digital light processing (DLP) projectors, digital micromirror devices (DMDs) as spatial light modulators, which bit-depth is limited, cannot reproduce low-level signals typical of most video sources. Therefore, a gain is applied to the input signal to obtain more dynamic range for the projection. However, since the input signal has been electrically amplified, it is necessary to optically reduce the brightness of the corresponding image to appropriate levels by use of an aperture in the light path of the DLP projectors. Furthermore, the aperture and gain must be dynamically determined frame-by-frame.

FIG. 4 shows an alternative proposed aperture 2. The aperture 2 includes a motor 3, a disc 4, and a stop rod 7. The disc 4 is installed to the motor 3 providing rotation of the disc 4 and defines two slots 5 shaped in an Archimedean spiral. One of the slots 5 is positioned in the light path to adjust light throughput. The other slot 5 is coupled to the stop rod 7 which can be controlled to stop the rotating disc 4 at an appropriate position to produce a desired light throughput. A shortcoming of the aperture 2 is that a narrow, thick connection portion 6 between the slots 5 can be easily broken by the stop rod 7, shortening service time of the aperture 2.

Therefore, it is desirable to provide a dynamic aperture and a projection device having the same, which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the dynamic aperture and the projection device. Moreover, in the drawings, like reference numerals designate corresponding parts throughout the several views.

DETAILED DESCRIPTION OF THE EMBODIMENTS

Figure 1:
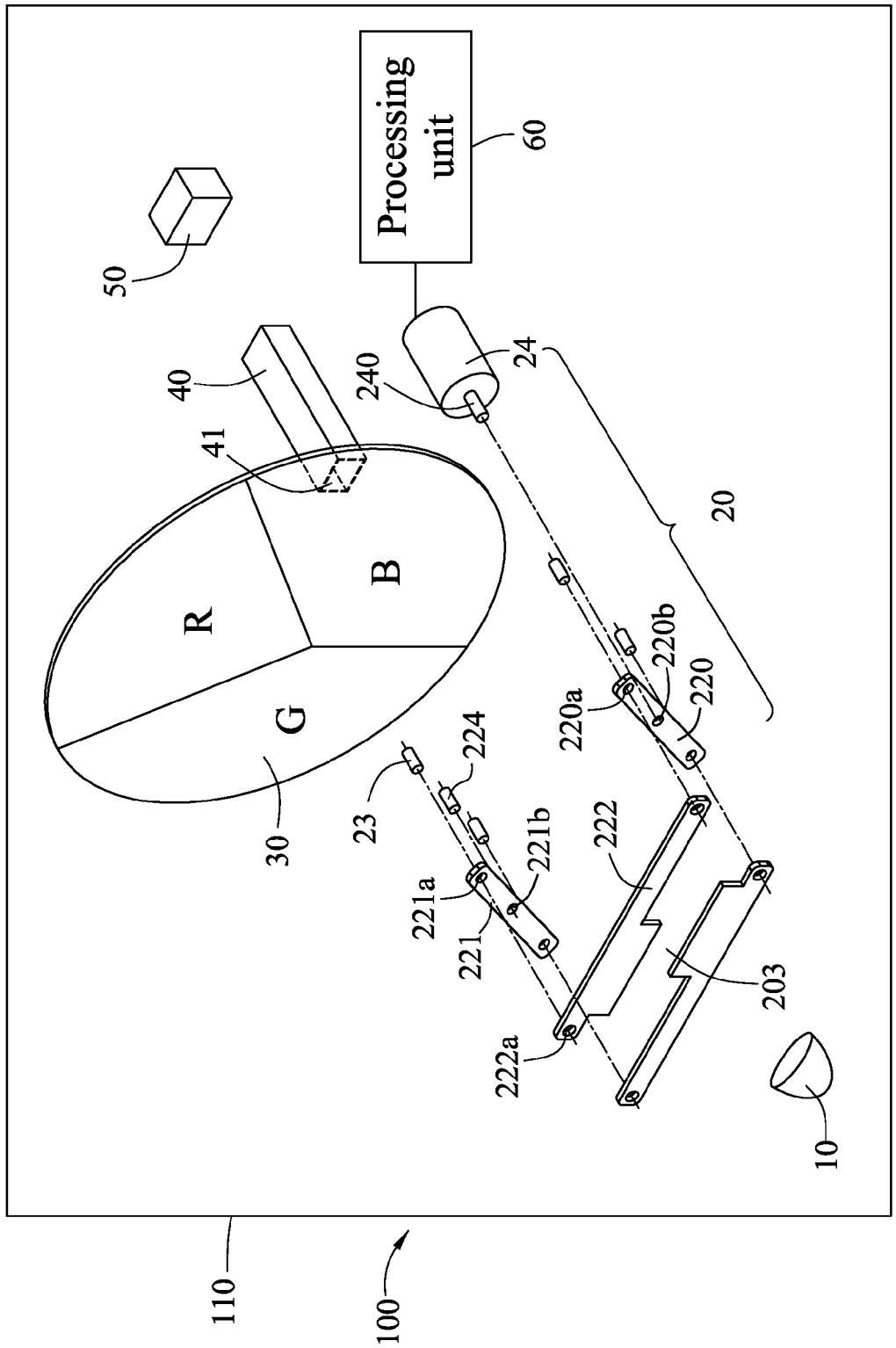
FIG. 1 is an isometric, schematic and exploded view of a projection device, according to an exemplary embodiment.

As shown in FIG. 1, a projection device 100, according to an exemplary embodiment, includes a light source 10, a dynamic aperture 20, a color wheel 30, an integrator rod 40, and a spatial light modulator 50. The projection device 100 also includes a housing 110 configured for receiving the light source 10, the dynamic aperture 20, the color wheel 30, the integrator rod 40, and the spatial light modulator 50 therein. The light source 10 is configured for generating light. The dynamic aperture 20, the color wheel 30, the integrator rod 40, and the spatial light modulator 50 are arranged along the path of the generated light. The light transmits through the dynamic aperture 20, the color wheel 30, and the integrator rod 40, and is modulated by the spatial light modulator 50 to produce an image which will be projected on a screen (not shown).

Figure 2:
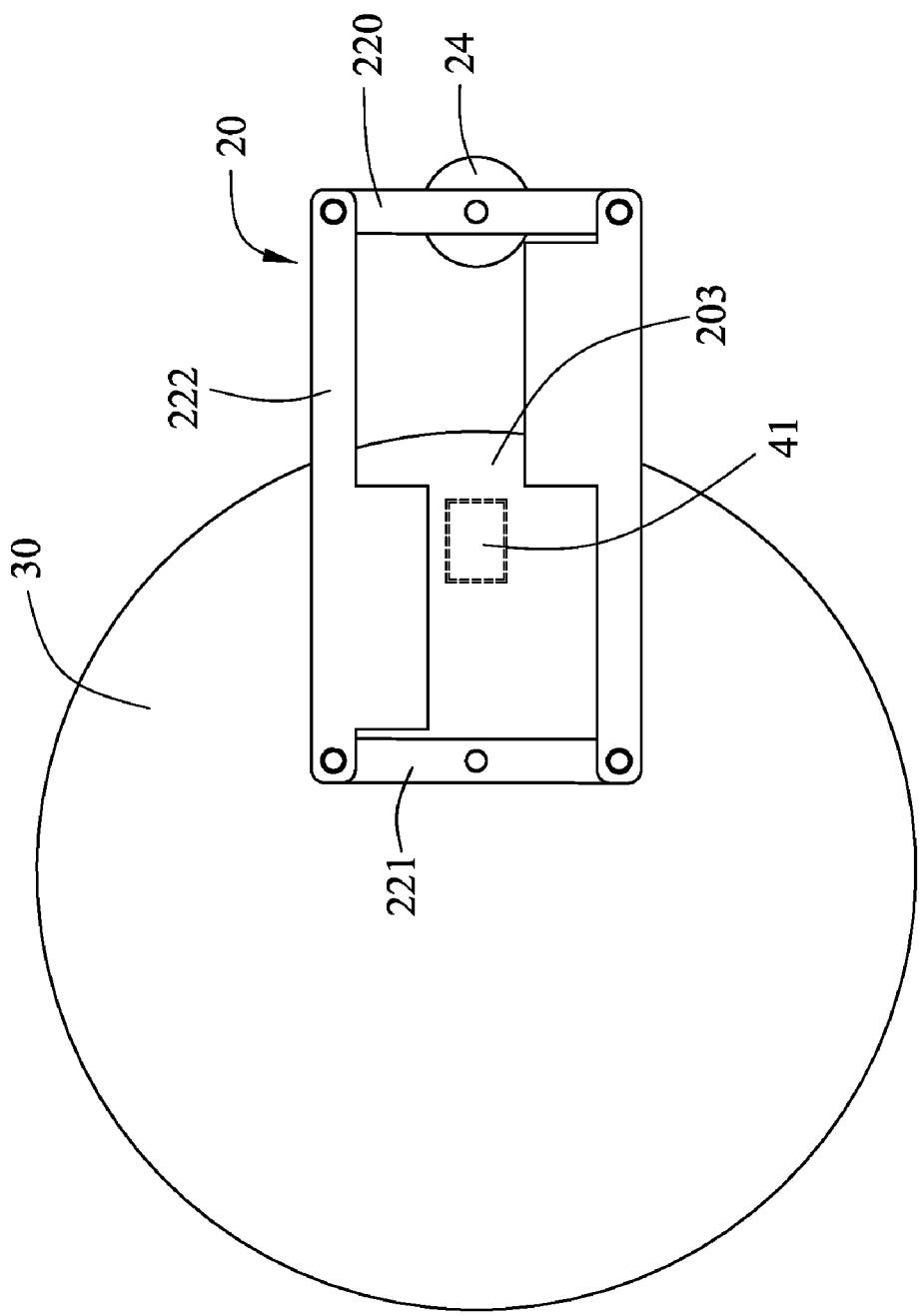
FIG. 2 is a planar, schematic view of a dynamic aperture in the projection device of FIG. 1, in an open position.
Figure 3:
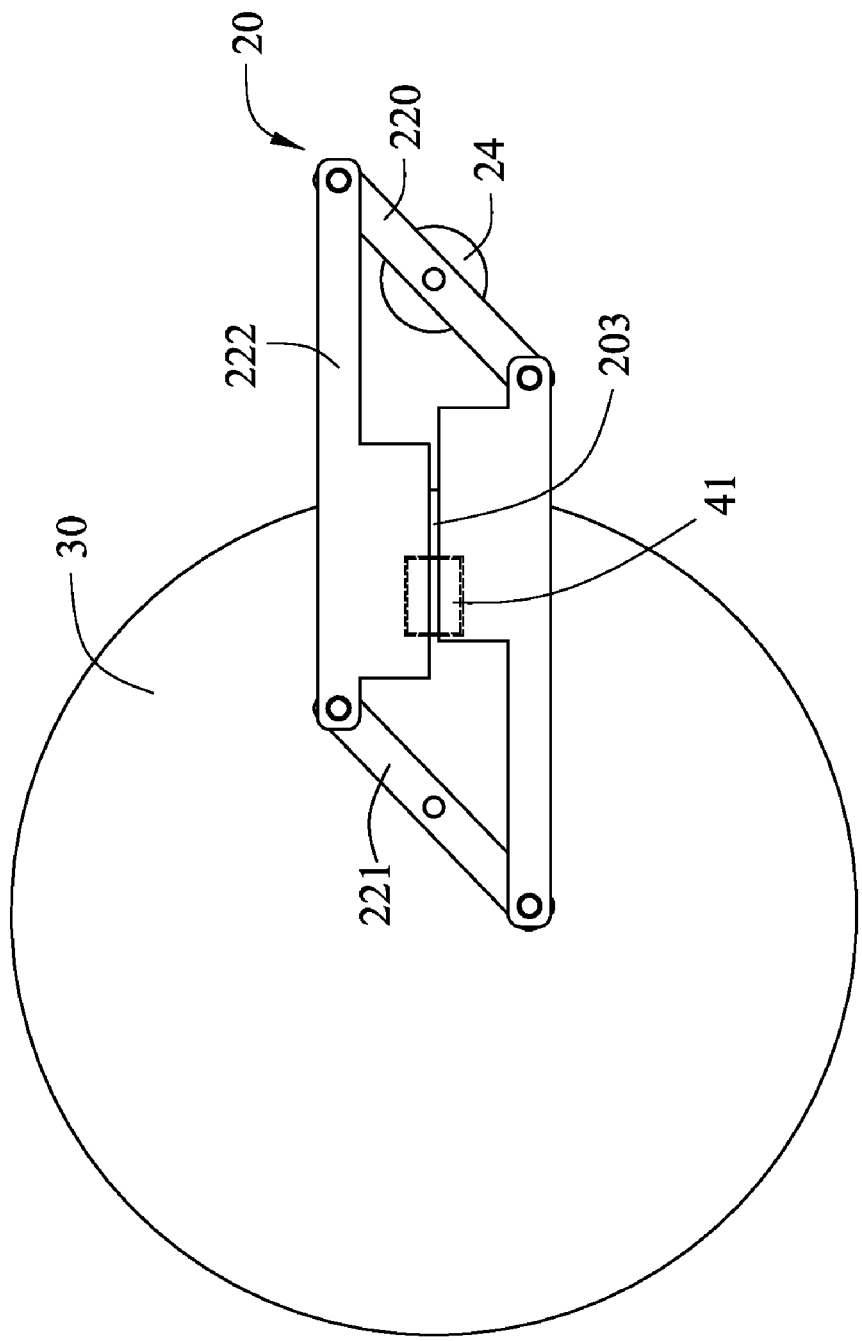
FIG. 3 is a planar, schematic view of the dynamic aperture of FIG. 2, in a closed position.
Figure 4:
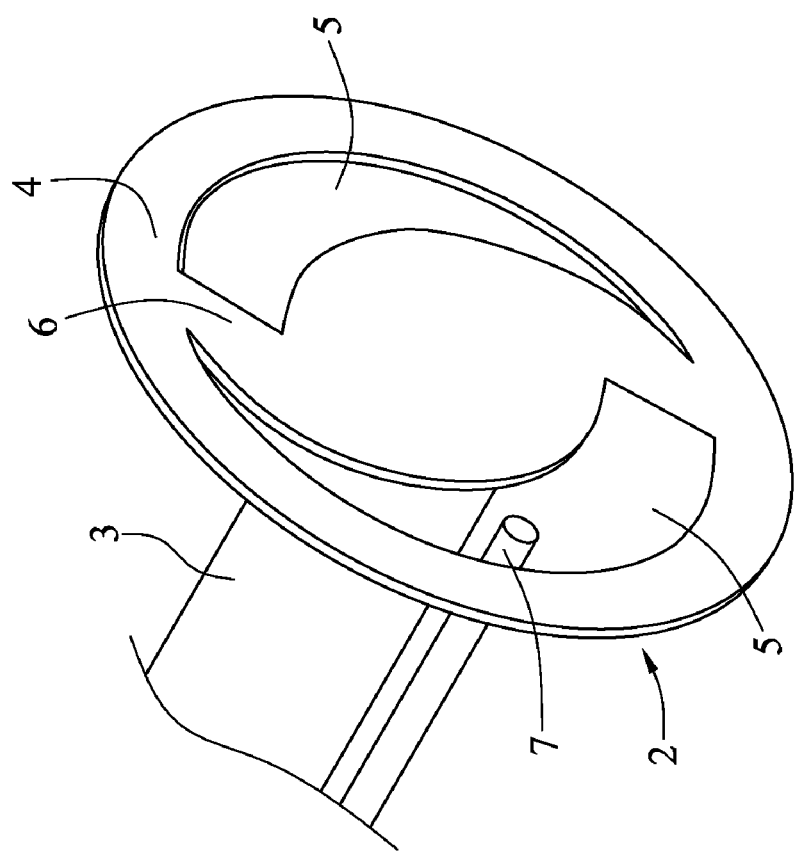
FIG. 4 is an isometric, schematic view of an aperture of a projection device according to a related art.

Also referring to FIGS. 2-3, the dynamic aperture 20 includes a driving member 220, a connecting member 221, two blades 222, and an aperture motor 24. The driving member 220, the connecting member 221, and the two blades 222 are rotatably connected to each other to form a variable quadrangular frame. The variable quadrangular frame is positioned in the light path and is capable of altering the light transmitted therethrough to adjust the amount of the light entering the integrator rod 40 using the blades 222. In particular, in the quadrangular frame, the blades 222 are parallel, the driving member 220 is coupled to a motor 24, and the connecting member 221 is rotatably fixed to the housing 110. Thereby, the driving member 220 can be rotated by the motor 24 to adjust a gap 203 between the blades 222, thorough which the light is allowed to transmit.

In this embodiment, the distal ends of the driving member 220, the connecting member 221 and the blades 222 define through holes 220a, 221a, 222a respectively. The driving member 220, the connecting member 221 and the blades 222 are arranged so that each through hole 222a is aligned with a corresponding through hole 220a or 221a. The dynamic aperture 20 further includes four fasteners 23. The fasteners 23 respectively pass through the four pairs of the aligned through holes 220a, 221a, 222a to rotatably connect the driving member 220, the connecting member 221 and the blades 222. The driving member 220 further defines a driving hole 220b at the middle portion thereof. The motor 24 includes a driving rod 240. The driving member 220 is coupled to the motor 24 by fixedly fitting the driving rod 240 into the driving hole 220b. The connecting member 221 defines a fixing through hole 221b at the middle portion thereof. The dynamic aperture 20 also includes a fixing rod 224 with one end rotatably entering the fixing through hole 221b and the other end fixed to the housing 110. When the motor 24 rotates the driving member 220, restricted by the driving rod 240, the varying quadrangular frame changes dimensions and the gap 203 between the blades 222 is adjusted.

It should be noted that the dynamic aperture 20 is not limited to the morphology disclosed. For example, the rotatable connection is not limited to incorporation of the through holes 220a, 221a, 222a and the fasteners 23 but can employ other available structures. The through holes 220a, 221a, 222a are not restricted to exact formations at the distal ends or middle portions and can be determined depending on requirements. The shape and the position of the blades 222 are also not limited here.

The projection device 100 further includes a processing unit 60. The processing unit 60 is electrically coupled to the motor 24. In operation of the dynamic aperture 20, the processing unit 60 determines the aperture value and instructs the motor 24 to provide a corresponding rotation. For example, for a specific frame of an image, if it is determined that the dynamic aperture 20 should be completely open, the motor 24 is directed to rotate counterclockwise. Rotation of the driving rod 240 and restriction by the fixing rod 224 in turn alter the dimensions of the quadrangular frame from, for example, a closed position shown in FIG. 3 to an open position shown in FIG. 2. If, for a sequential image, it is determined that the dynamic aperture 20 should be closed, the dynamic aperture 20 is directed to rotate clockwise.

The color wheel 30 is configured for separating light transmitted from the dynamic aperture 20 into colors, such as red (R), green (G), and blue (B), in sequence.

The integrator rod 40 is configured for normalizing colored light leaving the color wheel 30 and entering an entrance 41 of the integrator rod 40, providing uniform brightness from the projection device 100 to the projected image.

The projection device 100 includes dynamic aperture 20, thereby providing regular and effective adjustment of the light flux according to signals input from the processing unit 60. Moreover, in the operation of the dynamic aperture 20, the driving member 220, the connecting member 221 and the blades 222 are prevented from contacting other elements and avoiding damage therefrom, thus extending the product lifetime.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dynamic aperture for use in a projection device, the projection device comprising a light source configured for generating light, the dynamic aperture being positioned in the path of the light and comprising:
   a pair of parallel blades;
   a connecting member rotatably fixed to the projection device and rotatably interconnecting two same sides of the blades, respectively;
   a driving member rotatably interconnecting the two opposite sides of the blades correspondingly so that the blades, the connecting member, and the driving member constitute a variable quadrangular frame; and
   a motor coupled to, and capable of rotating, the driving member;
   wherein rotation of the driving member is able to alter the dimensions of the variable quadrangular frame and accordingly adjust a gap between the blades through which the generated light passes.

2. The dynamic aperture of claim 1, wherein distal ends of the driving member, connecting member, and the blades define corresponding through holes respectively, each of the through holes aligns with the corresponding through hole.

3. The dynamic aperture of claim 2, further comprising four fasteners inserted through the four pair of the aligned through holes respectively to rotatably connect the driving member, connecting member, and the blades together.

4. The dynamic aperture of claim 1, wherein the driving member defines a driving hole at the middle portion thereof to connect to the motor.

5. The dynamic aperture of claim 4, wherein the motor comprises a driving rod coupled the driving member by the driving rod fitting into the driving hole thereof.

6. The dynamic aperture of claim 4, wherein the connecting member defines a fixing through hole at the middle portion of the connecting member used to mount the connecting member to the structure of the projection device.

7. The dynamic aperture of claim 1, wherein the projection device comprises a processing unit electrically coupled to the motor.

8. The dynamic aperture of claim 7, wherein the processing unit is capable of determining an aperture value and instructing the motor to provide a corresponding rotation in operation of the dynamic aperture.

9. A projection device, comprising a light source configured for generating light, comprising:
   a housing;
   a dynamic aperture mounted on the housing and positioned in the path of light and comprising:
      a pair of parallel blades;
      a connecting member rotatably fixed to the projection device and rotatably interconnecting two same sides of the blades, respectively;
      a driving member rotatably interconnecting the two opposite sides of the blades correspondingly so that the blades, the connecting member, and the driving member constitute a variable quadrangular frame; and
      a motor coupled to and configured for rotating the driving member; and
   a processing unit coupled to the motor electrically and configured for determining an aperture value and instructing the motor to provide a corresponding rotation in operation of the dynamic aperture,
      wherein rotation of the driving is able to alter the dimensions of the variable quadrangular frame and accordingly adjust a gap between the blades through which the generated light passes.

10. The projection device of claim 9, wherein distal ends of the driving member, connecting member, and the blades define corresponding through holes respectively, each of the through holes aligns with the corresponding through hole.

11. The projection device of claim 10, further comprising four fasteners passing through the four pairs of the aligned through holes respectively to rotatably connect the driving member, connecting member, and the blades.

12. The projection device of claim 9, wherein the driving member defines a driving hole at the middle portion of the driving member to connect to the motor.

13. The projection device of claim 12, wherein the motor comprises a driving rod, the driving member coupled to the motor by the driving rod fitting into the driving hole thereof.

14. The projection device of claim 9, wherein the connecting member defines a fixing through hole at the middle portion thereof to mount the connecting member to the structure of the projection device.

* * * * *